United States Patent [19]
Casolari et al.

[11] Patent Number: 6,082,397
[45] Date of Patent: Jul. 4, 2000

[54] GAS MANIFOLD CONNECTOR AND GAS DISTRIBUTION MANIFOLD ASSEMBLY FOR GAS STOVE

[75] Inventors: David A. Casolari, Arlington; Christos Vassiliou, Princeton; Joseph L. Asta, Des Plaines; James D. Kimble, Oswego, all of Ill.

[73] Assignee: Harper-Wyman Company, Aurora, Ill.

[21] Appl. No.: 09/156,975

[22] Filed: Sep. 18, 1998

[51] Int. Cl.⁷ ..................................................... F16L 15/00
[52] U.S. Cl. ....................... 137/561 A; 285/191; 285/197
[58] Field of Search ................................... 285/191, 197, 285/198, 199; 137/883, 884, 561 A, 507; 251/317, 317.01

[56] References Cited

U.S. PATENT DOCUMENTS

| | | | |
|---|---|---|---|
| 566,881 | 9/1896 | Thurston | 285/198 |
| 775,903 | 11/1904 | Jeavons | 285/197 X |
| 1,039,950 | 10/1912 | Jeavons | 285/198 |
| 1,832,106 | 11/1931 | Ernst | 285/198 |
| 2,575,965 | 11/1951 | Malm | 285/191 |
| 2,605,140 | 7/1952 | Bartling | 285/191 X |
| 3,730,565 | 5/1973 | Steudler, Jr. | 285/197 X |
| 3,746,308 | 7/1973 | Vatterott | 285/197 X |
| 3,806,031 | 4/1974 | Olson | 137/861 X |
| 3,870,348 | 3/1975 | Hawkins | 285/197 |
| 4,029,118 | 6/1977 | Merideth | 137/318 X |
| 4,506,917 | 3/1985 | Hansen Arne | 285/198 X |

*Primary Examiner*—Stephen M. Hepperle
*Assistant Examiner*—John Bastianelli
*Attorney, Agent, or Firm*—Mason, Kolehmainen, Rathburn & Wyss; Philip M. Kolehmainen

[57] ABSTRACT

A gas distribution connector and a gas distribution manifold assembly are provided for gas burners for a gas stove. The gas distribution manifold assembly includes an elongated gas distribution manifold defining a gas distribution chamber. The gas distribution manifold includes a first aperture formed in a first wall and a second aperture formed in a second wall. At least one gas distribution connector is mounted on the gas manifold. The gas distribution connector includes a connector body defining a gas passageway including a gas inlet and a gas outlet. The connector body includes a downwardly depending connector body portion slidingly received through the first manifold aperture and extending within the manifold chamber, locating the gas outlet within the manifold chamber. The downwardly depending connector body portion includes mounting means for mounting engagement with a fastener received through the second manifold aperture.

13 Claims, 5 Drawing Sheets

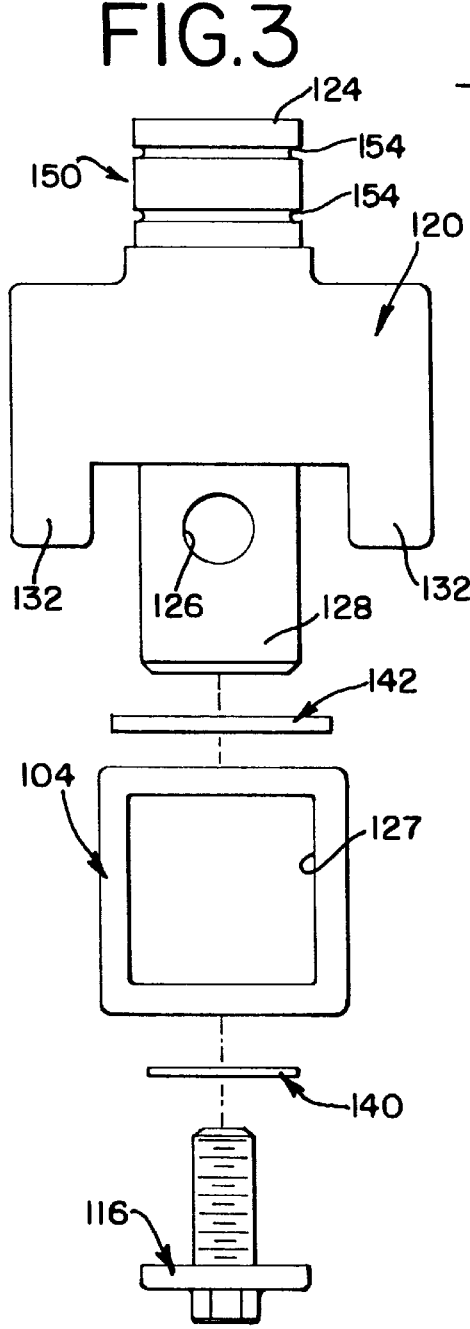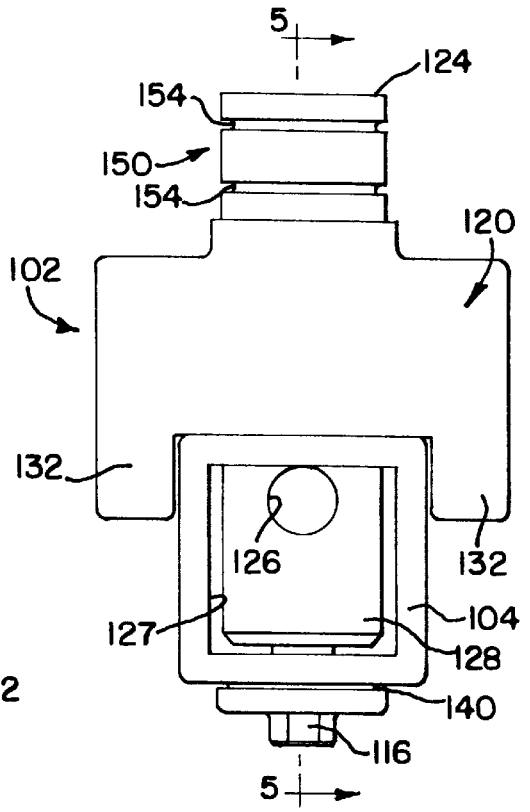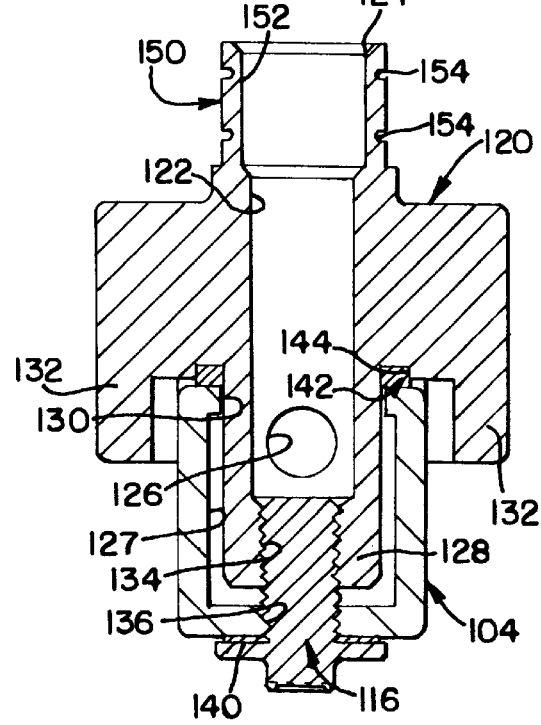

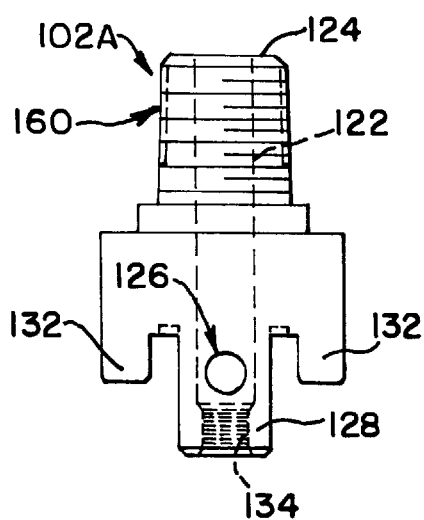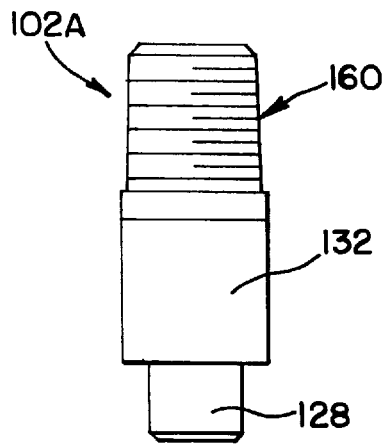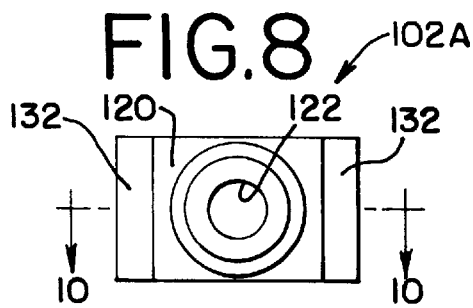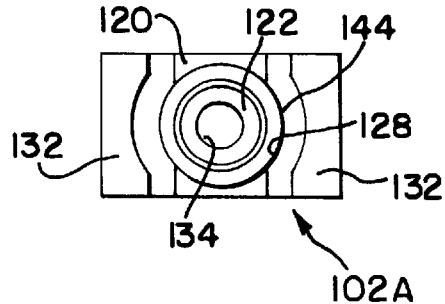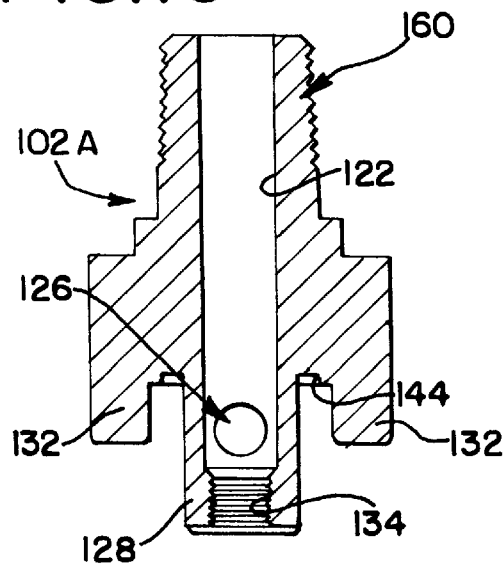

6,082,397

GAS MANIFOLD CONNECTOR AND GAS DISTRIBUTION MANIFOLD ASSEMBLY FOR GAS STOVE

FIELD OF THE INVENTION

The present invention relates generally to gas distribution manifolds for gas burners, and more particularly to an improved gas distribution connector used with a gas distribution manifold and a gas distribution manifold assembly for gas burners for a gas stove.

DESCRIPTION OF THE PRIOR ART

Square thickwall manifolds often are used for gas distribution to gas burners in a gas stove. A problem with the conventional gas distribution manifold is that complicated bending of the square thickwall manifolds is required to accommodate different gas routings. Also costly welded fittings typically are used for connecting a gas supply with gas distribution manifolds today.

It is desirable to provide an improved gas distribution connector and a gas distribution manifold assembly for gas burners for a gas stove. A need exists to provide such connector and gas distribution manifold assembly that provides effective operation; that is rugged and easily assembled; and that can be easily manufactured.

SUMMARY OF THE INVENTION

Among the principal objects of the present invention are to provide a new and improved connector for a gas distribution manifold and a gas distribution manifold assembly for gas burners for a gas stove; to provide such connector and gas distribution manifold assembly that enables easy assembly and flexible gas distribution arrangements and provides reliable operation; and to provide such connector and gas distribution manifold assembly overcoming one or more of the disadvantages of known gas distribution arrangements.

In brief, the objects and advantages of the present invention are achieved by a gas distribution connector and a gas distribution manifold assembly for gas burners for a gas stove. The gas distribution manifold assembly includes an elongated gas distribution manifold defining a gas distribution chamber. The gas distribution manifold includes a first aperture formed in a first wall and a second aperture formed in a second wall. At least one gas distribution connector is mounted on the gas manifold. The gas distribution connector includes a connector body defining a gas passageway including a gas inlet and a gas outlet. The connector body includes a downwardly depending connector body portion slidingly received through the first manifold aperture and extending within the manifold chamber, locating the gas outlet within the manifold chamber. The downwardly depending connector body portion includes mounting means for mounting engagement with a fastener received through the second manifold aperture.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is an exploded elevational view of the gas distribution connector of FIG. 1;

FIG. 4 is an assembled elevational view of the gas distribution connector with a square gas distribution manifold of FIG. 1;

FIG. 5 is a fragmentary cross-sectional view taken along the line 5—5 of FIG. 4;

FIGS. 6 is front elevational view of an alternative gas distribution connector in accordance with the principles of the present invention;

FIG. 7 is a side elevational view of the alternative gas distribution connector of FIG. 6 in accordance with the principles of the present invention;

FIG. 8 is a top elevational view of the alternative gas distribution connector of FIG. 6 in accordance with the principles of the present invention;

FIG. 9 is a bottom elevational view of the alternative gas distribution connector of FIG. 6 in accordance with the principles of the present invention;

FIG. 10 is a fragmentary cross-sectional view taken along the line 10—10 of FIG. 8;

DETAILED DESCRIPTION OF THE PREFERRED EMBODIMENTS

Figure 1:
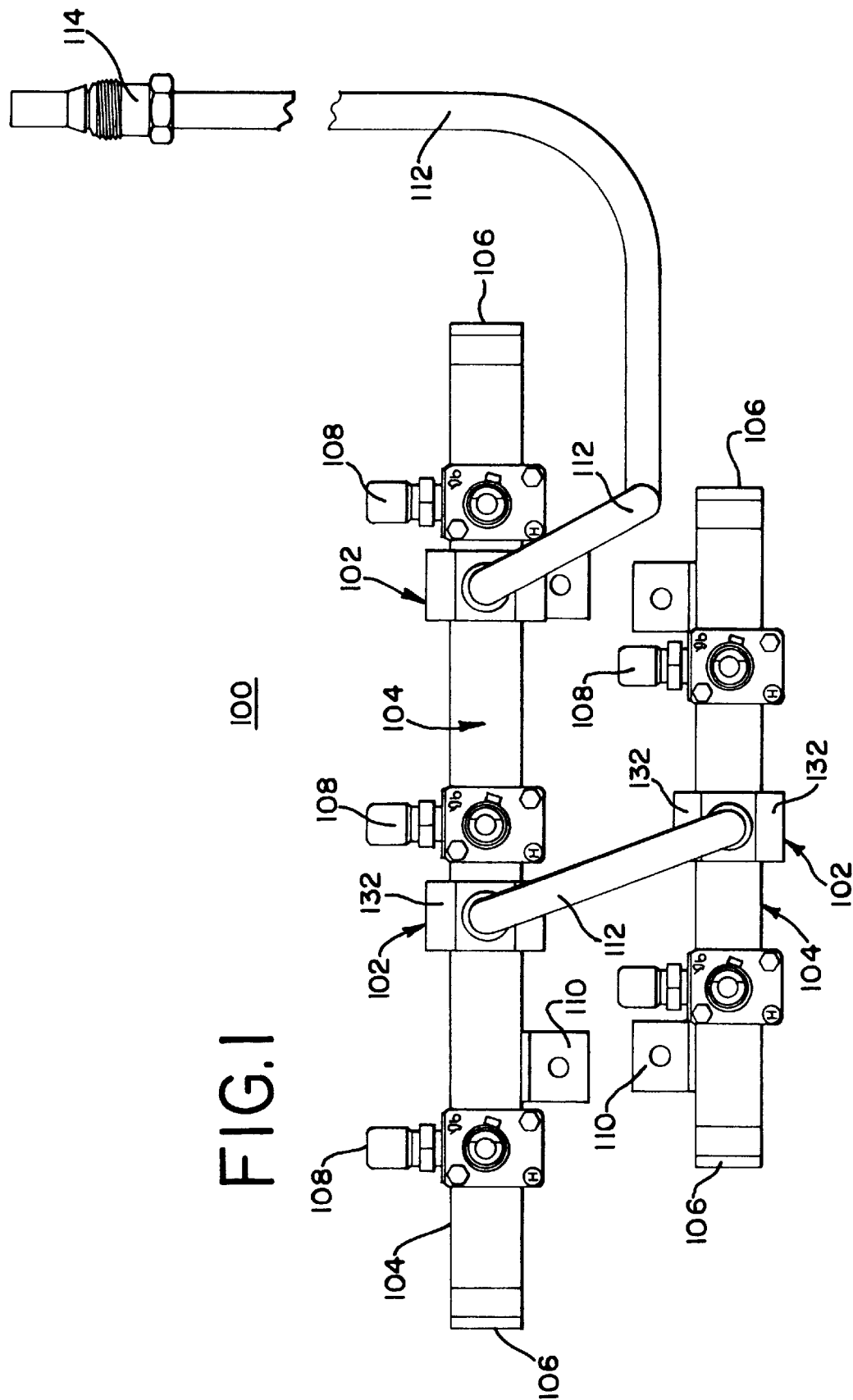
FIG. 1 is a top elevational view of a gas distribution manifold assembly for gas burners for a gas stove and a gas distribution connector constructed in accordance with the principles of the present invention.
Figure 2:
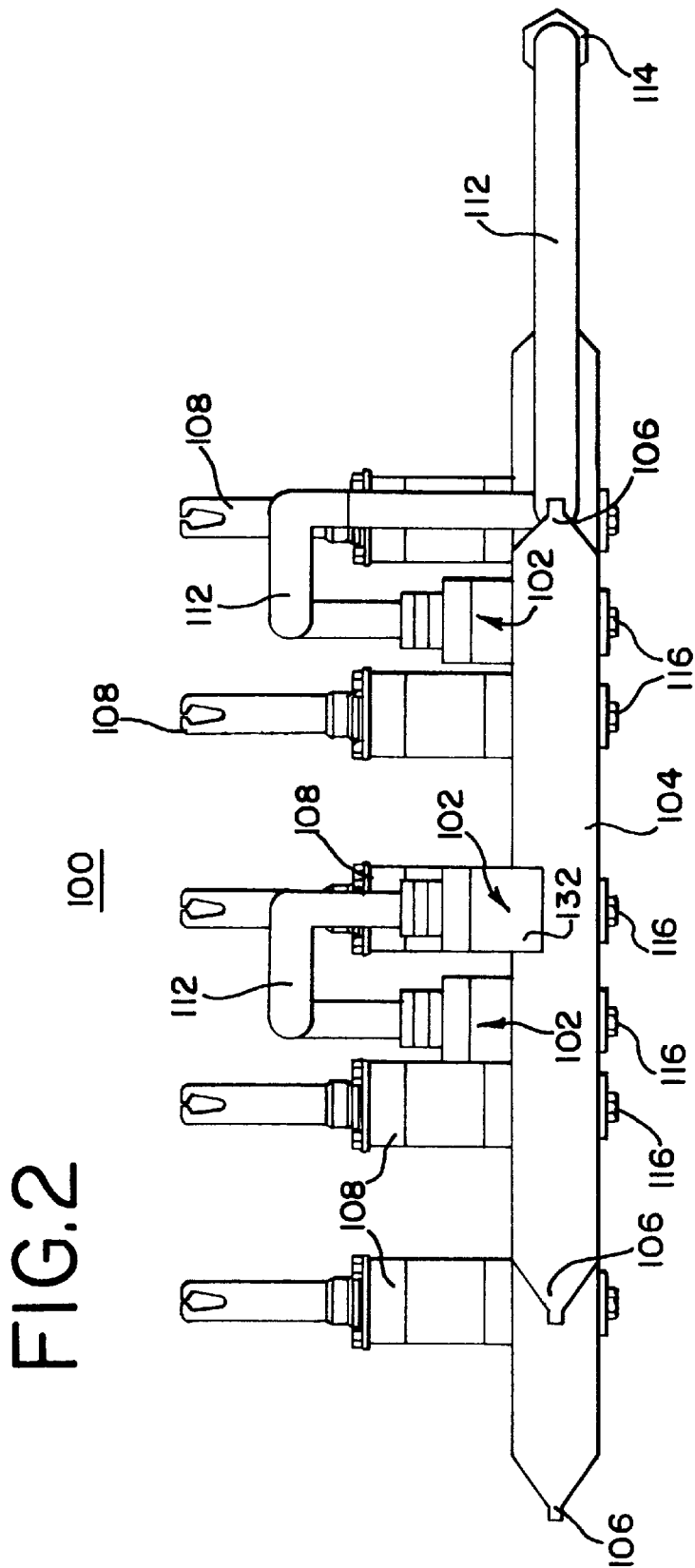
FIG. 2 is a side elevational view of the gas distribution manifold assembly for gas burners for a gas stove and the gas distribution connector of FIG. 1 constructed in accordance with the principles of the present invention.

Referring now to the drawings, in FIGS. 1–2, there is illustrated a gas distribution manifold assembly designated as a whole by the reference character 100 for gas burners for a gas stove (not shown) together with a gas distribution connector designated as a whole by the reference character 102 and arranged in accordance with principles of the present invention. The gas distribution manifold assembly 100 includes a pair of square manifolds or tubes 104. Each of the square manifolds 104 has opposed closed ends designated by 106. A plurality of gas valves 108 are connected to the square manifolds 104 for supplying gas to gas burners. A pair of brackets 110 are used to mount the manifolds 104 to a burner box (not shown).

In accordance with features of the invention, the gas distribution connector 102 provides an easily assembled connection for gas supply tubes 112 and various other devices, such as a gas regulator. As shown in FIGS. 1 and 2, a first gas supply tube 112 connected to a fitting 114 is connected to one gas distribution manifold 104 with one gas distribution connector 102. Another pair of gas distribution connectors 102 connect a second gas supply tube 112 between the two gas distribution manifolds 104. The square manifolds 104 are straight pipe sections instead of a conventional single gas distribution manifold requiring bends to locate the valves 108, as shown in FIGS. 1 and 2. It should be understood that features of the invention are not limited to the arrangement of FIGS. 1 and 2, various flexible arrangements of the gas distribution manifold assemblies 104 are enabled using the gas distribution connector 102. The gas distribution connector 102 includes a single fastener 116 for mounting to the connector 102 to the gas distribution manifold 104. An identical fastener 116 as used for mounting the valves 108 advantageously is used with the gas distribution connectors 102.

Having reference also to FIGS. 3–5, there is shown the gas distribution connector 102 in accordance with principles of the present invention. The gas distribution connector 102 includes a body 120 defining a gas passageway 122 and having a gas inlet 124 connected, for example, with gas supply line 112 and an outlet 126 located within the gas distribution manifold 104. Gas distribution connector body 120 includes a centrally located, downwardly depending portion 128 slidingly received within an aperture 130 provided within the manifold 104. Downwardly depending connector body portion 128 containing part of the gas passageway 122 has a generally rectangular or square shape and locates the gas outlet 126 within a gas chamber 127 defined by gas distribution manifold 104. Manifold aperture 130 having a corresponding rectangular or square shape is punched or otherwise formed at a selected located within the manifold 104. The gas outlet 126 advantageously is formed by a single hole drilled or otherwise formed through the connector body portion 120.

Gas distribution connector body 120 includes a pair of downwardly extending, parallel legs 132 slidingly mounted on the gas distribution manifold 104. Gas distribution connector legs 132 position and provide orientation for the gas distribution connector 102. Gas distribution connector body portion 128 includes a threaded aperture 134 receiving the fastener 116 and aligned with a corresponding opening 136 within the manifold 104. A seal between the fastener 116 and manifold 104 is provided by a fastener gasket 140 carried by the fastener 116. A block gasket 142 received within a corresponding aperture 144 formed in the connector body 120 shown in FIG. 5 provides a seal between the gas distribution connector 102 and manifold 104.

Attachment of the tube 112 to the connector body 120 is provided with a connector body portion 150 receiving the tubing 112. The connector body portion 150 has a bore 152 receiving the tubing 112 and having an inner diameter approximately equal to an outer diameter of tubing 112. Referring to FIGS. 3–5, a pair of grooves 154 initially are formed by drilling or machining around the exterior of connector body portion 150. Grooves 154 are generally cylindrical extending around the exterior of the connector body portion 150. A force is applied to the connector body portion 150 via a swage or die member longitudinally along the tube 112 causing an area near grooves 154 to deform together with a tubing 112 to achieve a mechanical bond forming the tubing joint.

U. S. patent application Ser. No. 08/842,664, filed Apr. 15, 1997 and assigned to the present assignee discloses tubing joints and method for attachment of tubing to valves and extrusion. A tubing joint as disclosed in the above identified patent application advantageously is formed with connector body portion 150. The subject matter of the above identified patent application is incorporated herein by reference.

Referring now to FIGS. 6–10, there is shown an alternative gas distribution connector generally designated 102A in accordance with the principles of the present invention. In FIGS. 6–10, the same reference characters as used with gas distribution connector 102 are used for identical or substantially similar features of the gas distribution connector 102A. In the gas distribution connector 102A, a connector body portion or nipple 160 is provided with threads 162 for mechanical coupling with a compression coupling (not shown) or similar device. The threaded connector body portion 160 is used instead of the connector body portion 150 of the gas distribution connector 102.

The gas distribution connector 102A similarly includes a body 120 defining a gas passageway 122 and having a gas inlet 124 connected, for example, with gas supply line 112 and an outlet 126 located within the gas distribution manifold 104. In the gas distribution connector 102A, the gas distribution connector body 120 includes a centrally located, downwardly depending cylindrical body portion 128 slidingly received within an aperture 130 provided within the manifold 104. Manifold aperture 130 has a corresponding circular shape provided at a selected located within the manifold 104. The gas outlet 126 similarly is formed by a single hole drilled or otherwise formed through the connector body portion 120. Gas distribution connector body 120 similarly includes a pair of downwardly extending, parallel legs 132 slidingly mounted on the gas distribution manifold 104 for positioning and providing orientation for the gas distribution connector 102A. Gas distribution connector body portion 128 similarly includes a threaded aperture 134 receiving the fastener 116 and aligned with a corresponding opening 136 within the manifold 104.

Figure 11:
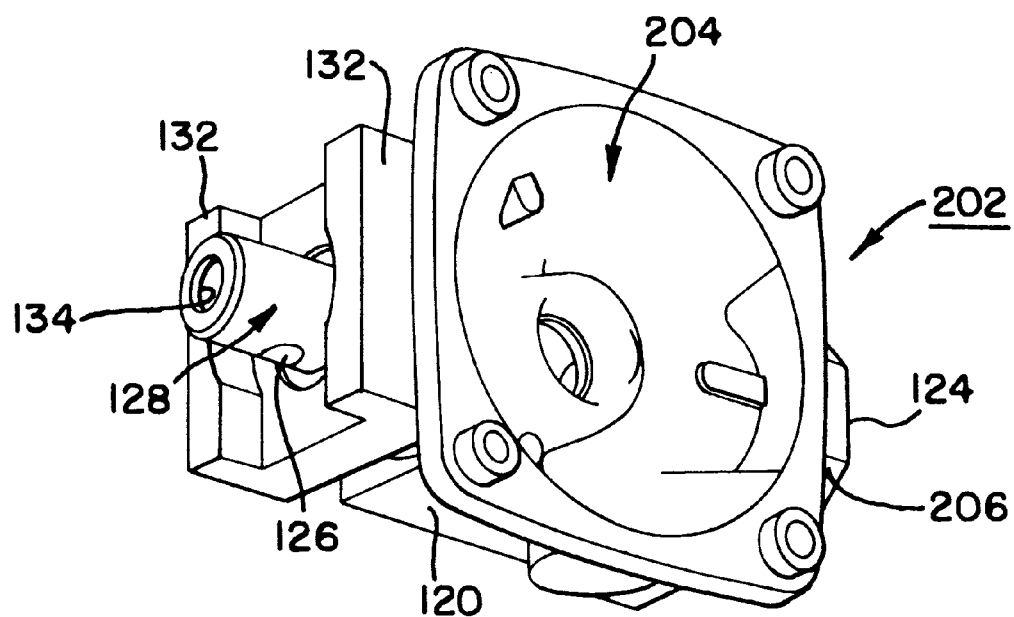
FIG. 11 is a perspective view of a second alternative gas distribution connector used with a gas distribution manifold in accordance with the principles of the present invention.
Figure 12:
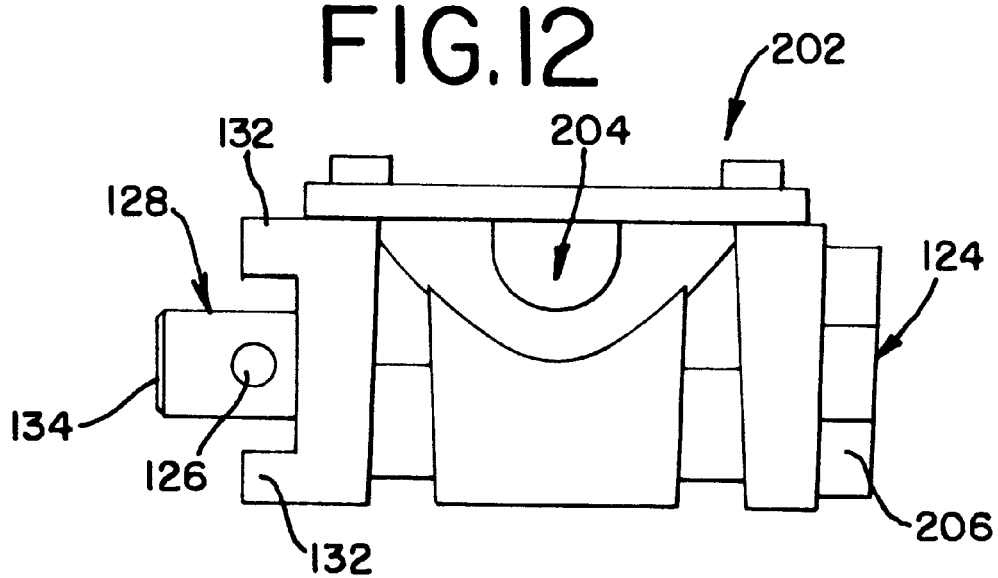
FIG. 12 is a side elevational view of the second alternative gas distribution connector of FIG. 11 in accordance with the principles of the present invention.

Referring now to FIGS. 11 and 12, there is shown a second alternative gas distribution connector generally designated 202 used with a gas distribution manifold 104 in accordance with the principles of the present invention. The second alternative gas distribution connector 202 comprises a gas pressure regulator directly mounted to the gas distribution manifold 104. In FIGS. 11–12, the same reference characters as used with gas distribution connector 102 are used for identical features of the gas distribution connector, pressure regulator 202. The gas distribution connector, pressure regulator 202 includes a pressure regulating mechanism generally designated by 204. As shown, the gas distribution connector, pressure regulator 202 includes a connection nut 206 at the inlet 124 instead of nipple 160 of connector 102A, or the connector body portion 150 of the gas distribution connector 102. It should be understood that either of the inlet connections 150, 160 or 206 can be used with each of the 102, 102A, and 202. It should be understood that either the gas inlet 124 or the gas outlet 126 may receive an incoming gas supply depending on a particular application of the gas distribution connector 102, 102A, 202.

The gas distribution connector, pressure regulator 202 similarly includes a body 120 defining the gas passageway 122 and having a gas inlet 124 and an outlet 126 located within the gas distribution manifold 104. In the gas distribution connector, pressure regulator 202, a centrally located, downwardly depending cylindrical body portion 128 is slidingly received within a circular aperture 130 provided within the manifold 104. The gas distribution connector, pressure regulator 202 similarly includes a pair of downwardly extending, parallel legs 132 slidingly mounted on the gas distribution manifold 104 to position and provide orientation for the pressure regulator 202. Likewise, the connector body portion 128 includes a threaded aperture 134 receiving the fastener 116 and aligned with a corresponding opening 136 within the manifold 104.

While the present invention has been described with reference to the details of the embodiments of the invention shown in the drawing, these details are not intended to limit the scope of the invention as claimed in the appended claims.

What is claimed is:

1. A gas distribution manifold assembly for gas burners comprising:

an elongated gas distribution manifold defining a gas distribution chamber; said gas distribution manifold including a first aperture formed in a first wall and a second aperture formed in a second wall;

at least one gas distribution connector mounted on said gas manifold, said gas distribution connector including a connector body defining a gas passageway including a gas inlet and a gas outlet;

said connector body including a downwardly depending connector body portion slidingly received within said first manifold aperture and extending within said manifold chamber and locating said gas outlet within said manifold chamber;

said downwardly depending connector body portion including mounting means for mounting engagement with a fastener received through said second manifold aperture wherein said gas distribution connector body includes a pair of downwardly extending, parallel legs slidingly mounted on said gas distribution manifold to position and provide orientation for the gas distribution connector.

2. A gas distribution manifold assembly for gas burners as recited in claim 1 wherein said downwardly depending connector body portion is generally centrally located between said pair of downwardly extending, parallel legs.

3. A gas distribution manifold assembly for gas burners comprising:

an elongated gas distribution manifold defining a gas distribution chamber; said gas distribution manifold including a first aperture formed in a first wall and a second aperture formed in a second wall;

at least one gas distribution connector mounted on said gas manifold, said gas distribution connector including a connector body defining a gas passageway including a gas inlet and a gas outlet;

said connector body including a downwardly depending connector body portion slidingly received within said first manifold aperture and extending within said manifold chamber and locating said gas outlet within said manifold chamber;

said downwardly depending connector body portion including mounting means for mounting engagement with a fastener received through said second manifold aperture wherein said connector body defining said gas passageway including said gas inlet and said gas outlet includes inlet connection means for connecting with a threaded coupling and wherein said gas distribution connector includes a pressure regulating mechanism.

4. A gas distribution manifold assembly for gas burners comprising:

an elongated gas distribution manifold defining a gas distribution chamber; said gas distribution manifold including a first aperture formed in a first wall and a second aperture formed in a second wall;

at least one gas distribution connector mounted on said gas manifold, said gas distribution connector including a connector body defining a gas passageway including a gas inlet and a gas outlet;

said connector body including a downwardly depending connector body portion slidingly received within said first manifold aperture and extending within said manifold chamber and locating said gas outlet within said manifold chamber;

said downwardly depending connector body portion including mounting means for mounting engagement with a fastener received through said second manifold aperture wherein said downwardly depending connector body portion is a generally rectangular member slidingly received within said first manifold aperture, said first manifold aperture being a corresponding generally rectangular opening.

5. A gas distribution connector used with a gas distribution manifold defining a gas chamber and having first and second apertures, said gas distribution connector comprising:

a connector body defining a gas passageway including a gas inlet and a gas outlet;

said connector body including a downwardly depending connector body portion slidingly received within the first manifold aperture and extending within the manifold chamber and locating said gas outlet within the manifold chamber;

said downwardly depending connector body portion including mounting means for mounting engagement with a fastener received through the second manifold aperture;

wherein said connector body is a unitary extruded member formed of an aluminum material and wherein said connector body includes a pair of downwardly extending, parallel legs slidingly mounted on the gas distribution manifold to position and provide orientation for the gas distribution connector with the gas distribution manifold.

6. A gas distribution connector as recited in claim 5 wherein said gas distribution connector includes a pressure regulating mechanism.

7. A gas distribution manifold assembly for gas burners comprising:

an elongated gas distribution manifold defining a gas distribution chamber; said gas distribution manifold including a connector-receiving aperture formed in a first wall of said gas distribution manifold;

at least one gas distribution connector mounted on said gas manifold, said gas distribution connector including a connector body defining a gas passageway including a gas inlet and a gas outlet;

said connector body including a downwardly depending connector body portion slidingly received through said manifold connector-receiving aperture and extending within said manifold chamber and locating said gas outlet within said manifold chamber; and said connector body including includes a pair of downwardly extending, parallel legs slidingly mounted on said gas distribution manifold for positioning said gas distribution connector.

8. A gas distribution manifold assembly for gas burners as recited in claim 7 wherein said elongated, gas distribution manifold is a square, generally straight, gas distribution manifold.

9. A gas distribution manifold assembly for gas burners as recited in claim 7 wherein said connector body is an integral member.

10. A gas distribution manifold assembly for gas burners as recited in claim 7 wherein said downwardly depending connector body portion includes mounting means for mounting engagement with a fastener received through said second manifold aperture.

11. A gas distribution connector used with a gas distribution manifold defining a gas chamber, said gas distribution connector comprising:

a connector body defining a gas passageway including a gas inlet and a gas outlet;

said connector body including an integrally formed downwardly depending connector body portion slidingly received within a corresponding manifold aperture and extending within the manifold chamber to locate said gas outlet within the manifold chamber; and said connector body including a pair of integrally formed downwardly extending, parallel legs slidingly mounted on said gas distribution manifold for positioning said gas distribution connector.

12. A gas distribution connector as recited in claim 11 wherein said downwardly depending connector body portion includes mounting means for mounting engagement with a fastener received through a manifold aperture.

13. A gas distribution connector as recited in claim 11 wherein said gas distribution connector includes a pressure regulating mechanism.

* * * * *